United States Patent
Hose et al.

(10) Patent No.: US 6,829,033 B2
(45) Date of Patent: Dec. 7, 2004

(54) PRESENTATION SCHEDULING IN DIGITAL CINEMA SYSTEM

(75) Inventors: Jesse Hose, Carlsbad, CA (US);
Michael Mitrani, San Diego, CA (US);
Roger Olmstead, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/233,257

(22) Filed: Aug. 30, 2002

(65) Prior Publication Data

US 2003/0048418 A1 Mar. 13, 2003

Related U.S. Application Data

(60) Provisional application No. 60/316,921, filed on Aug. 31, 2001.

(51) Int. Cl.[7] .......................... G03B 19/18; H04N 7/18; H04N 7/173
(52) U.S. Cl. ............................ 352/40; 725/78; 725/116
(58) Field of Search ............................. 725/74, 78, 86, 725/93, 116; 352/40, 244

(56) References Cited

U.S. PATENT DOCUMENTS

| | | | | |
|---|---|---|---|---|
| 6,141,530 A | * | 10/2000 | Rabowsky | 725/116 |
| 6,384,893 B1 | * | 5/2002 | Mercs et al. | 352/133 |
| 2002/0095679 A1 | * | 7/2002 | Bonini | 725/74 |
| 2002/0156912 A1 | * | 10/2002 | Hurst et al. | 709/236 |

* cited by examiner

*Primary Examiner*—Rodney Fuller
*Assistant Examiner*—Arthur A Smith
(74) *Attorney, Agent, or Firm*—Philip R. Wadsworth; Sandip S. Minhas; Jae-Hee Choi

(57) ABSTRACT

Embodiments disclosed allow assigning programs for presentation in a digital cinema system. In one embodiment, a scheduler 180 is implemented to generate a schedule in accordance to which decoding modules 140 control playback of data for presentation in the digital cinema systems. The decoding module 140 may operate in an automatic mode and/or manual mode. In automatic mode, the decoding module 140 controls playback based on the schedule, without user intervention. In manual mode, the decoding module 140 cues the user at the appropriate times to control playback based on the schedule.

68 Claims, 8 Drawing Sheets

PRESENTATION SCHEDULING IN DIGITAL CINEMA SYSTEM

RELATED APPLICATIONS

This application claims priority from U.S. Provisional patent application entitled "Apparatus and Method for Presentation Scheduling in a Digital Cinema System," Ser. No. 60/316,921, filed Aug. 31, 2001.

BACKGROUND

I. Field of Invention

The invention generally relates to digital cinema and is more particularly related to scheduling one or a plurality of presentations in a digital cinema system.

II. Description of the Related Art

Video compression is a key factor of multimedia. An effective digital compression can reduce the cost as well as increase the quality of video displayed over any digital communication. One application of the video compression technique is in the motion picture industry.

In the traditional motion picture industry, theatre operators receive reels of celluloid film from a studio or through a distributor for eventual presentation in a theatre auditorium. The reels of film include the feature program (a full-length motion picture) and a plurality of previews and other promotional material, often referred to as trailers. The theatre operator may also be required or choose to present some of its own trailers, often comprising of local promotional and advertising material. A two hour motion picture plus five minutes of trailers, for example, generates approximately 11,250 feet of celluloid film. As a result, theatre operators may receive a two hour movie that is divided into five or six reels.

One way to present the multiple reels of film is to use two projectors. One projector is threaded with the first reel and the other projector with the second reel. The theatre operator starts the film on the first projector. At an appropriate time for a changeover, the theatre operator starts the second projector and stops the first projector. While the second reel is rolling, the theatre operator removes the first reel and threads a third reel on the first projector. This swapping continues throughout the presentation. Therefore, the theatre operator must monitor each presentation in each auditorium for the changeovers.

Alternatively, a device called a platter is also used in theatres. A platter may consist of two or more large discs of approximately four or five feet in diameter that are stacked vertically about one to two feet apart. The discs are large enough to hold one large spool of film, which the theatre operator assembles by splicing together all of the lengths of film from the different reels. Splicing is the process of cutting the end of one strip of film so that it carefully matches up to the beginning of the next strip of film, and then taping the strips together. This allows the theatre operator to show the entire presentation without changeovers.

Therefore, a theatre operator builds a "platter" by sequencing reels of celluloid film in the order in which it is to be presented, and physically splicing together the film to be played by the projector. A theatre operator may also insert cues and milestones onto celluloid film by physically attaching trigger strips onto the film. Cues may be attached in between programming, or within a particular feature or trailer. Currently, a theatre operator controls auditorium environment through the use of theatre automation systems. Theatre automation systems control such functions as turning lights on and off, opening and closing curtains, and changing the projector lens. Theatre automation systems control these functions by reading a trigger strip physically placed onto the film as the film passes through a reader connected to the theatre automation system. Trigger strips are typically metallic or optical pieces of tape adhered onto the film. When the tape passes under the reader, an electrical signal is output to the theatre automation system.

Along with reels of films comprising features and trailers, the theatre operator receives one or more soundtracks to be played with each film. Soundtracks come in a variety of languages and sound formats. Sound formats, such as stereo, 7.1, or 5.1, refer to the number of channels the sound format requires. Because sound systems vary greatly from theatre to theatre, the studio or distributor typically ship multiple soundtracks for a given film.

Moreover, trailers and features each have associated ratings, which define the appropriateness of the material for a given audience. In the United States, ratings are labeled to motion pictures and trailers by the Motion Picture Association of America (MPAA). However, different jurisdictions have different ratings systems, and not all jurisdictions are consistent as to the rating level of a given program. Accordingly, a theatre operator in a given jurisdiction need be conscious of the types of programs he plans to display together.

Therefore, when a theatre operator is building a platter, the operator must be careful to ensure that the platter is created accurately. For example, each image program should have the appropriate soundtrack loaded, in terms of language and sound format. Moreover, the image programs on the platter should have the appropriate ratings. That is, one wants to ensure that an "R" rated trailer is not displayed with a "G" rated movie. Further, cues must be inserted in the proper places and the correct lens needs to be attached to the projector in order for viewing at the proper display aspect ratio. However, human error is inevitable and all too frequent.

An evolution of the film industry is occurring as the industry moves from celluloid film to digitized image and audio programs. However, theatres are not equipped to process digital programming to create and schedule "digital platters."

SUMMARY

Advances in digital technology have led to a distribution concept whereby presentation material is electronically stored in a digitized format. Digitized images may be distributed on various storage mediums such as magnetic media or compact optical discs, and/or transmitted over wired, fiber optic, wireless, or satellite communication systems.

To reduce the data rate requirement for the storage and/or transmission of high quality electronic images, compression algorithms are being developed. For example, absolute discrete cosine transform (ABSDCT) allows significant compression while preserving the quality of image signals. ABSDCT is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention. Further, the use of the ABSDCT technique in combination with a Discrete Quadtree Transform technique is discussed in U.S. Pat. No. 5,452,104, entitled "Adaptive Block Size Image Compression Method And System," also assigned to the assignee of the present invention.

Technologies such as ABSDCT offer the possibility of a "digital cinema" system. Generally defined, digital cinema refers to the electronic distribution and display of high quality film programming which has been converted to a digital electronic representation for storage, transmission, and display purposes. A digital cinema system would overcome many of the limitations of the current film distribution process. A digital system would not be subject to the quality degradation over time experienced by celluloid film. Further, a digital system may eliminate the theft and illegal duplication of films by allowing implementation of security measures within the digital system itself. Moreover, distribution of film information using a digital electronic format actually increases the potential for rapid, low-cost duplication without quality degradation.

With the advent of digital cinema systems, full-length motion pictures, trailers, advertisements and other audio/image "cinema-quality" programs are delivered to theatres throughout the world using digital technology. Authorized theatres receive the digitized programs and store them, typically while still compressed. At each showing, the digitized information is retrieved via a local area network from the storage medium, then is decrypted if necessary, decompressed and displayed using cinema-quality electronic projectors featuring high quality digital sound.

In one embodiment, a presentation system comprises a theatre manager configured to control presentation and a scheduler configured to allow assignment of one playlist for presentation. The scheduler is also configured to allow assignment of one or more playlists for presentation by generating a schedule. The scheduler may be implemented in the theatre manager. The presentation system may further comprise a decoding module configured to prepare contents of each assigned playlist for playback. The decoding module may check the schedule and control playback of the contents of each playlist based on the schedule. Alternatively, the decoding modules may check the schedule and cue a user to control playback of the contents of each assigned playlist.

In another embodiment, a method for presentation comprises generating a schedule to assign one or more playlists for presentation and controlling presentation of the assigned one or more playlists based on the schedule. In still another embodiment, a presentation system comprises means for assigning a single playlist for presentation and means for generating a schedule to assign one or more playlists for presentation.

In the above embodiments, a message indicating a change in the schedule may be sent if a change is made in the schedule. Also, a verification that the digital cinema system has resources to present each assigned playlist can be performed when generating the schedule. The verification may be performed by the scheduler or the decoding module. Moreover, generation of the schedule may comprise designating a playlist as a repeating playlist and/or designating a playlist as an intermission playlist. The intermission playlist may either be assigned and presented between a predetermined two assigned playlists or be presented between each assigned playlist.

In a further, a method for generating a schedule comprises displaying a list of playlists, assigning one or more playlists for presentation based on the list and generating a schedule based on the assigned one or more playlists. The method may further comprise verifying that the digital cinema system has resources to present each playlist assigned in the schedule when generating the schedule, and rejecting assignment of a playlist in the schedule if the digital cinema does not have the resource. Also, the method may comprise either one or a combination of checking that each image program needed to present each playlist exists, checking that each audio program needed to present each playlist exists, checking that no security conflict exists, checking that no time conflicts are created and checking that there is no resource conflicts. The method may further comprise specifying a presentation start date of each selected playlist, specifying a presentation end date of each selected playlist, specifying the start time for one day, and/or replicating the start time across multiple days, starting on a presentation start date and ending on a presentation end date, if a presentation end date that is later than a presentation start date.

In yet a further embodiment, a method for decoding programs for presentation comprises checking a schedule to determine if there is a schedule entry for presentation, the schedule entry being comprised of one or more programs, and initiating playback of the schedule entry according to the schedule by appropriately decoding each program of the schedule entry. Checking the schedule comprises determining a next schedule entry for presentation.

Initiating playback comprises initiating playback of the next schedule entry according to the time it is scheduled to start. Here, determining the next schedule entry comprises determining the next schedule entry as the earliest schedule entry whose start time is equal to or greater than a current time.

Also, a user may be cued to control the playback of the next schedule entry. Here, determining the next schedule entry comprise locating a current schedule entry and determining an entry following the current schedule entry to be the next schedule entry; and otherwise determining the next schedule entry as the earliest schedule entry whose start time is equal to or greater than a current time.

In yet another embodiment, a decoding system for decoding programs comprises three states, an intermission state, a paused state and a running state. The decoding system comprises starting presentation of a currently scheduled playlist from the beginning of the playlist when a start command is received, if the decoding system is in an intermission state; starting presentation of the currently scheduled playlist from approximately the point the playlist was stopped when a start command is received, if the decoding system is in a paused state; entering the paused state when a stop command is received before completing the presentation of the playlist; and entering the intermission state either if a cancel command is received or if the presentation of the playlist is completed.

The system may comprise a decoding module with a user interface. Alternatively, the system may comprise a theatre manager having a user interface. The user interface may comprise either one or a combination of a visual indicator that signifies that the decoding system is online, a visual indicator that signifies that the decoding system is currently processing a playlist and a visual indicator that signifies that the decoding system is in the paused state. The user interface may also comprise either one or a combination of means for receiving the start command, means for receiving the pause command and means for receiving the cancel command.

BRIEF DESCRIPTION OF THE DRAWINGS

Various embodiments will be described in detail with reference to the following drawings in which like reference numerals refer to like elements, wherein.

DETAILED DESCRIPTION

Generally, the disclosed embodiments allow a user such as theatre operator to schedule presentations in a digital cinema system. In one embodiment, a user can schedule a presentation and control the playback of the presentation. In another embodiment, a user can assign one or more presentations. More particularly, a schedule can be generated to assign one or more presentations.

Digital cinema may comprise the electronic generation, compression, encryption, and storage of audio/visual programming, such as motion pictures in theatre systems, theatres, theatre complexes, and/or other presentation systems. Accordingly, the invention is applicable to the presentation of image and audio information in a variety of locations such as theatre or theatre complex, outdoor amphitheatres, drive-in complexes, civic auditoriums, schools and specialty restaurants. For purposes of the explanation, the invention will be described with reference to a theatre or theatre complex. However, those skilled in the art will readily understand that the invention may be applied to other types of locations, systems and fields.

Also, as disclosed hereafter, the term "playlist" refers to a list of one or more programs for display in theatres, cinemas, televisions, and/or any other presentation system and/or locations. The term "program" refers to any digital data relating to an image, moving picture and/or associated soundtrack or audio. Examples of a moving picture includes, but is not limited to, a full or portion of motion picture, trailers, a movie, a video clip, a commercial, a drama or a combination thereof. The term "storage medium" refers to any one or more means for storing comprising high capacity data storage devices such as a digital versatile disk (DVD) or a removable hard drive (RHD). The terms "encryption" refers to any means of processing digital data streams of various sources using any of a number of cryptographic techniques to scramble, cover, or directly encrypt digital data streams using sequences generated using secret digital values ("keys") in such a way that it is very difficult to recover the original data sequence without knowledge of the secret key values.

Furthermore, it is noted that the invention may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
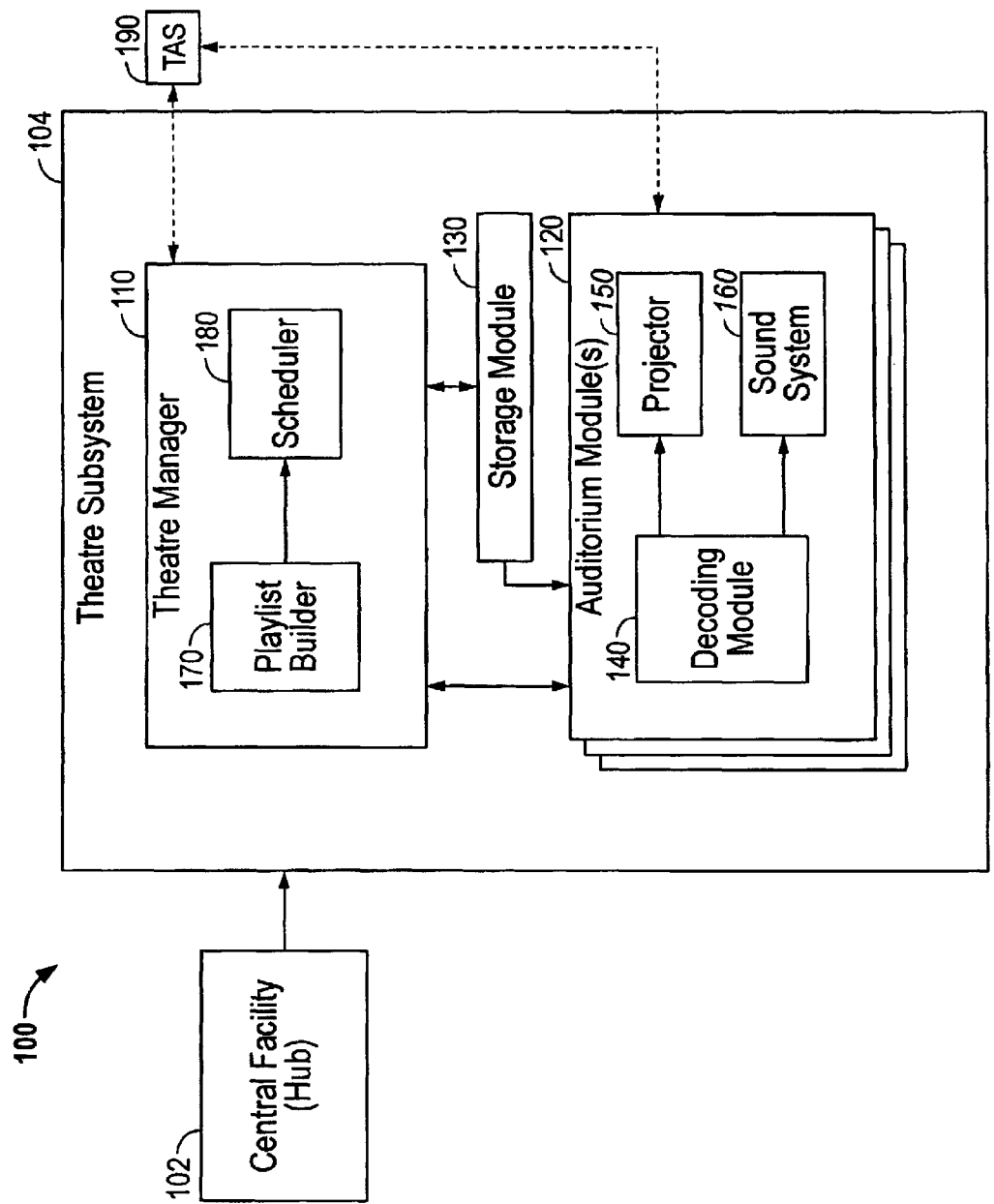
FIG. 1 shows an example of a digital cinema system.

One embodiment of a theatre complex implementing a digital cinema system 100 is illustrated in FIG. 1. Digital cinema system 100 comprises two main systems: at least one central facility or hub 102 and at least one presentation or theatre subsystem 104. The hub 102 and the theatre subsystem 104 may be of a similar design to that of pending U.S. patent application Ser. No. 09/075,152 filed on May 8, 1998, entitled, "Apparatus and Method for Distribution of High Quality Image and Audio Programs to Remote Locations," and pending U.S. patent application Ser. No. 09/564,174, filed May 3, 2000, entitled, "Apparatus and Method for Encoding and Storage of Digital Image and Audio Signals," and pending U.S. patent application Ser. No. 09/563,880, filed May 3, 2000, entitled, "Apparatus and Method for Decoding Digital Image and Audio Signals," all assigned to the same assignee as the present invention.

In the hub 102, a program is either generated or received from an external source. The program or digital information is then compressed and may be encrypted such that only specific locations, for example theatres, are authorized to show specific programs. The compressed and optionally encrypted program is distributed to the theatre subsystem 104. Here, the compressed information may be physically transported using a storage medium. Alternatively, the compressed information or portions thereof may be transmitted to a storage module 130 using any wireless and/or wired transmission methods. The wireless and/or wired transmission of the information compressed allows real time delivery and playback of presentations in the theatre subsystem 104.

The theatre subsystem 104 may comprise a theatre manager 110, at least one auditorium module 120 and the storage module 130. The storage module 130 may store one or more programs and one or more playlists. A playlist is a list comprising at least one or a combination of presentation entries or programs such as, for example, advertisement(s), preview(s), feature presentation(s), trailer(s) and cue(s). The auditorium module 120 is configured to present a playlist from the storage module 130. The theatre manager 110 is configured to assign a playlist for presentation in the auditorium module 120. In one embodiment, the theatre manager 110 assigns a playlist from the playlists stored in the storage module 130.

The auditorium module 120 may comprise a decoding module 140, a projector 150 and a sound module 160. When an assigned playlist is to be presented in the auditorium module 120, the decoding module 140 receives the compressed information or program(s) of the playlist from the storage module 130 and process the compressed information for playback. The decoding module 140 prepares the compressed information to a predetermined sequence, size and data rate. The compressed information is then decrypted (if necessary), decompressed and output respectively to a projector 150 and a sound module 160. The projector 150 plays back the image information on a projector and the sound module 160 plays back the audio information on the sound system. Therefore, the decoding module 140 is configured to prepare contents of each assigned playlist for playback.

More particularly, the theatre manager 110 comprises a scheduler 180 that allows users to schedule one or a plurality of playlists for presentation at an auditorium module 120. Scheduling involves assigning a playlist to a designated decoding module 140 at a designated time in a particular auditorium module 120. The scheduler 180 may comprise a user interface that displays a list of available playlist from which the user can select a playlist to schedule or assign. The name of the playlist currently scheduled or assigned on the decoding module 140 may also be displayed. Also, although the scheduler 180 shown in FIG. 1 is implemented in the theatre manager 110, the scheduler 180 may be implemented separately from the theatre manager 110.

In one embodiment, the theatre manager 110 may further comprise a playlist builder 170 configured to generate one or more playlists for presentation. A playlist may be created by a playlist builder as disclosed in pending U.S. patent application Ser. No. 09/708,361 filed on Mar. 2, 2001, entitled, "Apparatus and Method for Building a Playlist," assigned to the same assignee as the present invention. Generally, the playlist builder 170 allows users to generate a playlist from one or more programs stored in the storage module 130. In addition, the playlist builder 170 may also allow a user to insert a cue or milestone into a playlist. The generated playlist(s) may then be stored in the storage module 130. Alternatively, some or all of the playlists may be generated externally. Accordingly, in some embodiments, the theatre manager 110 may receive generated playlist(s) from an external source for storage in the storage module 130.

Once playlist(s) are generated and/or stored, the scheduler 180 may allow a user to schedule a single playlist. When a user attempts to schedule and/or update an assigned playlist, the decoding module 140 may verify that the system has resources to present the assigned playlist before presenting the playlist. The verification may include, but is not limited to, checking that each image program, each audio program, and each Cryptographic key needed to present the playlist in its entirety exist in the storage module 130. If the decoding module 140 determines that a resource is not available, the decoding module may reject the schedule change. The decoding module 140 may further send a message to the theatre manager 110 indicating the reason for the rejection.

Figure 2:
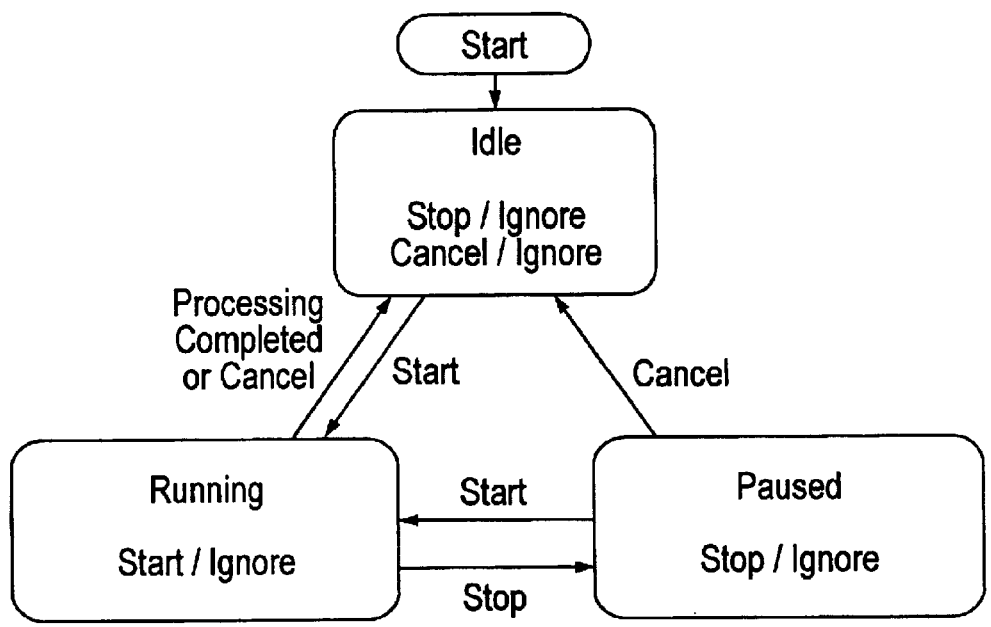
FIG. 2 shows the decoding module behavior in response to various commands.

After the scheduling of a playlist is verified, playback control may be performed by the theatre manager 110. Playback control may comprise starting, stopping and canceling the scheduled playlist. FIG. 2 shows the response of the decoding module 140 to the Start, Stop and Cancel commands based upon a current playback state of the decoding module 140. Starting from the Idle state 210, the designated decoding module 140 starts playback of the assigned playlist when a Start command is received from the theatre manager 110.

In some embodiments, the theatre subsystem may further comprises a Theatre Automation System (TAS) 190 that allows the theatre manager 110 to operate in a TAS mode. In TAS mode, the starting and stopping of the playback is performed by the TAS. More particularly, the designated decoding module 140 starts playback of the assigned playlist when a Start command is received from the TAS. The TAS allows users to automate the playback of a playlist including the execution of the necessary cue(s) for control of environmental functions. To avoid having multiple points of control, user may not be allowed to start or stop playback from the theatre manager 110 when operating in the TAS mode.

Referring back to FIG. 2, when a Start command is received while the decoding module 140 is in the Idle state 210, the decoding module 140 may start the presentation of the currently scheduled playlist, starting at the beginning of the playlist. Stopping playback before the presentation is complete may cause the decoding module 140 to stop the presentation, remember where in the presentation it was stopped, and/or dowse the projector 150. Here, the stopping of the playback may cause events other than dowsing of the projector 150. Starting playback after it has been stopped during a presentation may cause the presentation to continue at the point it was stopped, or as near as possible prior to that point to allow for resynchronization of the audio and image programs. Therefore, a Stop command received in the Running state 220 causes the decoding module 140 to enter a Paused state 230, wherein the decoding module 140 may save the information necessary to allow the decoding module 140 to restart the presentation at the point that it was stopped. When a Start command is received while the decoding module 140 is in the Paused state 230, the decoding module 140 may restart the presentation at the point in was stopped, or as near as possible prior to that point to allow for resynchronization of audio and image programs.

Canceling playback is done from the theatre manager 110 regardless of the mode. Canceling a presentation in the Running state 220 or the Paused state 230 has the same result in that the decoding module 140 does not remember where it was stopped. For example, the decoding module 140 may reset the presentation progress state such that the next time playback is started, the playlist will start from the beginning.

When a user attempts to cancel a current presentation, the theatre manager 110 may requests a confirmation from the user that requires a non-trivial affirmative response before executing the Cancel command. Requiring the user to click on an 'OK' button may be considered trivial, while requiring the user to type in a response (such as 'yes') may be considered non-trivial. The theatre manager 110 may allow a user to abort the Cancel command if there is not affirmative response to the theatre manager' 'Cancel confirmation' request. This is to reduce the possibility of accidentally canceling a presentation in progress.

Note that in the Idle state 210, the Stop and Cancel commands are ignored. Similarly, the Start command is ignored in the Running State 220 and the Stop command is ignored in the Paused state 230.

Therefore, the scheduler 180 is configured to schedule a playlist and then at a designated time, the theatre manager 110 and/or optionally the TAS is configured to control the presentation of a single playlist. In addition to scheduling a single playlist, the scheduler 180 may also allow a user to schedule or assign one or a plurality of playlists for presentation. This may be achieved by creating a schedule that the decoding module 140 checks regularly.

Figure 3:
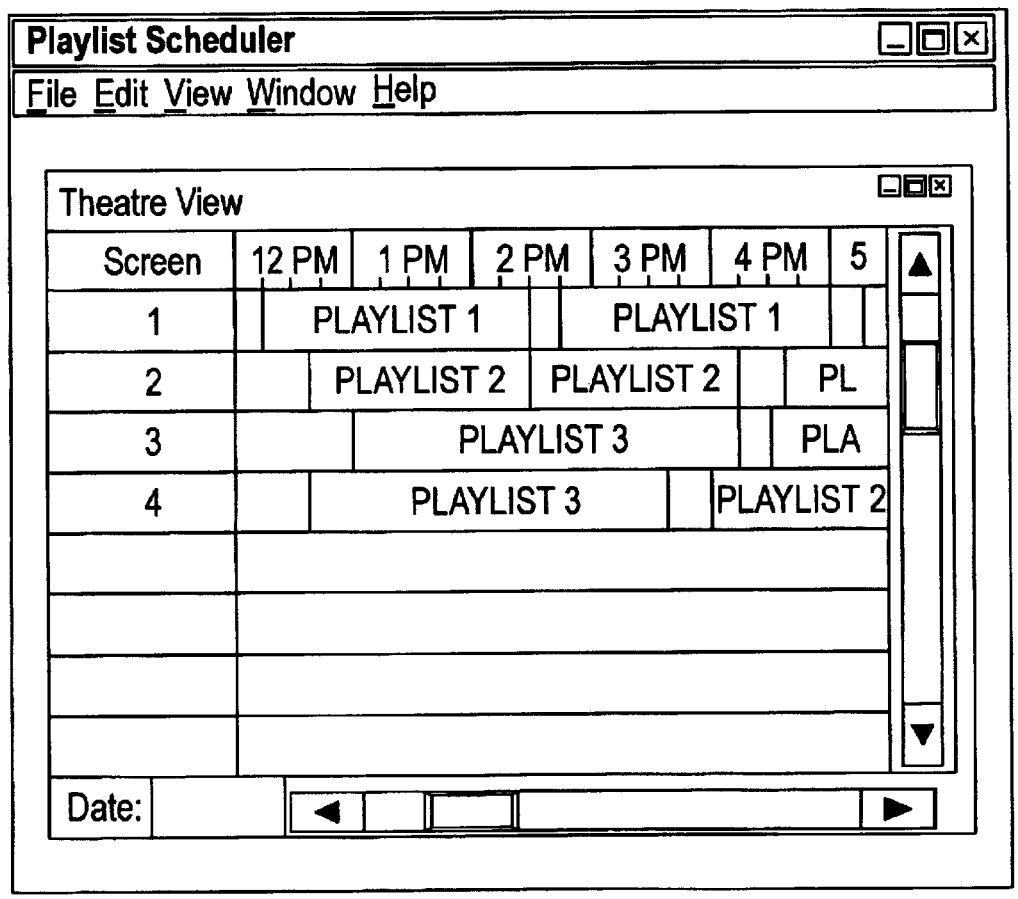
FIG. 3 shows an example view for scheduling playlists.

FIG. 3 shows an example of a user interface of the scheduler 180 that allows users to create and/or edit a schedule. The schedule may comprise a list of playlist identifications (IDs), the time that the playlist is scheduled to be presented, the ID of the decoding module that is to present the playlist, and other information relevant to presentation scheduling. Through the schedule, the decoding module 140 is informed of what and when to present a playlist.

Figure 4:
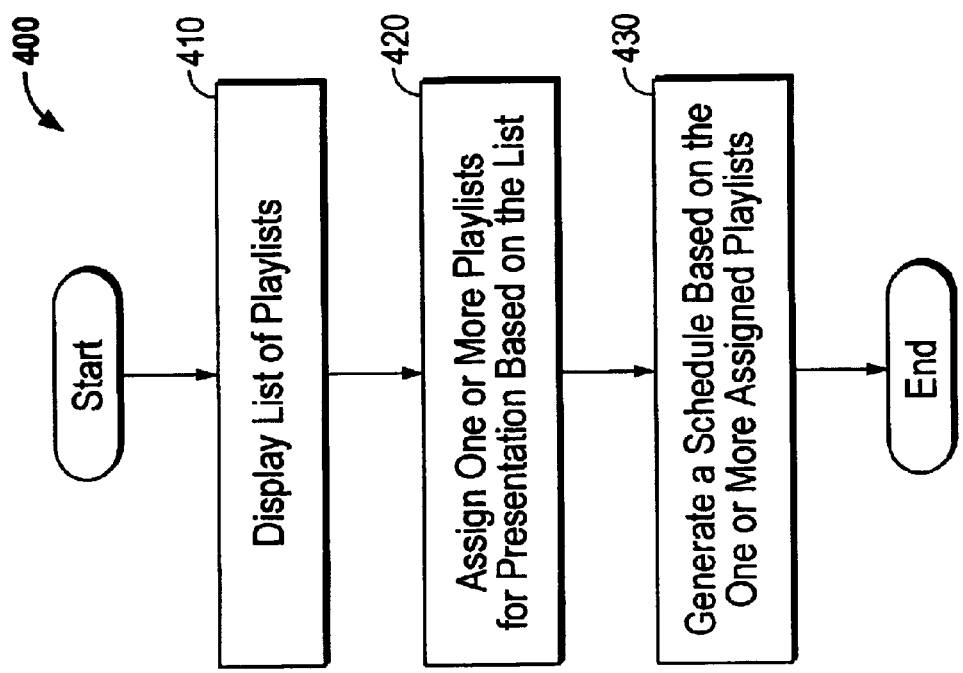
FIG. 4 shows an embodiment of a process for generating a schedule.

FIG. 4 shows one embodiment of a process 400 for generating a schedule to assign one or more playlists for presentation in a digital cinema system. Generally, a list of playlists is displayed (block 410) from which one or more playlists can be assigned for presentation (block 420). Based on the assigned one or more playlists, a schedule is generated. The generated schedule may be stored in the storage module 130 and can be updated using the user interface.

In some embodiments, the scheduler 180 may not allow any entity other than a playlist to be scheduled for presentation. Also, when scheduling playlist(s), scheduler 180 may require a user to specify the auditorium module 120 or screen for which the playlist is to be scheduled, to specify a presentation start date, and/or to specify a presentation end date. The start date may not be set to be earlier than the date on which the scheduling activity takes place, i.e. a start date cannot be in the past. The presentation end date may be the same or a later date as the presentation start date.

The scheduler 180 may allow a user to enter a single day's presentation start times, with up to a predetermined number, e.g. 8, of separate presentation start times per day. If a user has specified a presentation end date that is later than the presentation start date, i.e. user is scheduling for multiple days at once, the user has only to specify the start time for a single day and scheduler 180 may replicate the start times across each of the days, starting on the presentation start date and ending on the presentation end date. Scheduler 180 may allow a user to specify any special audio properties to be used for the presentations being scheduled.

Moreover, scheduler 180 may allow a user to designate the playlist as a repeating playlist. A playlist designated as a repeating playlist exhibits carousel-like behavior during presentation. A repeating playlist is scheduled for a specified period of time, called the repeat duration. If, during the presentation of a repeating playlist, the presentation of the last program of the playlist completes before the repeat duration has elapsed, the decoding module continues the presentation, starting over at the beginning of the playlist. When the repeat duration elapses the decoding module 140 ceases presentation of the playlist immediately even though the end of the program may not have been reached. If a user designates a playlist as a repeating playlist, scheduler 180 may require the user to enter the associated repeat duration.

Scheduler 180 may, on a per-screen basis, allow a user to specify a playlist as an intermission playlist for presentation during an intermission. Users may add properties including the ID of the playlist to be used as the intermission playlist. A repeating playlist may be specified as an intermission playlist. The intermission playlist can then be scheduled or assigned in the appropriate time slots or between two assigned playlists. Alternatively, the scheduler 180 may, on a per-screen basis, allow a user to enable or disable the intermission playlist behavior. If the intermission playlist is enabled, the intermission playlist would be presented between each assigned playlists, without user intervention.

Furthermore, when assigning a playlist into the schedule, scheduler 180 may verify that the system has resources to present each assigned playlist. The scheduler 180 may verify that no time conflicts are created by adding the playlist to the schedule, i.e. that no two presentations are scheduled during the same time period for a given decoding module 140. If there is a time conflict, scheduler 180 may notify the user of the conflict and reject the assignment of the playlist into the schedule. Also, scheduler 180 may verify that the programs specified in the playlist are present in the storage module 130. If scheduler 180 cannot find programs specified in the playlist, scheduler 180 may notify the user of the missing file(s) and reject the assignment of the playlist into the schedule. Furthermore, scheduler 180 may verify that no resource conflicts exist, i.e. that presenting the playlist at the specified times will not cause the system to exceed network capacities. If a resource conflict exists, scheduler 180 may notify the user of the conflict and reject the assignment of the playlist into the schedule. Scheduler 180 may verify that no security conflicts exist, i.e. that all required encryption keys are present and that the presentations fall within valid key epochs. If a security conflict exists, scheduler 180 may notify the user of the conflict and reject the assignment of the playlist into the schedule.

Scheduler 180 may allow a user to reserve a screen for a specified period of time. Auditorium module 120 may be reserved for something other than playlist presentation (e.g. maintenance or special function). This is a convenience feature that prevents double booking. Before allowing a user to reserve a screen, scheduler 180 may verify that no time conflicts are created by adding the reserve to the schedule. If a time conflict exists, scheduler 180 may notify the user of the conflict and not insert the reserve into the schedule.

After completing the assignment of playlist(s), scheduler 180 may allow a user to save the schedule to the storage module 130. Saving a schedule causes the scheduler 180 to send an 'Update Schedule' message to the decoding modules 140 in the theatre subsystem 104 to give notifications of the schedule change or update. The scheduler 180 sends to the auditorium 120 a message indicating a change or update in the schedule if a change or update is made in the schedule. Scheduler 180 may allow a user to exit the scheduler 180 application. User may save or discard unsaved changes prior to exiting the application.

Scheduler 180 may allow a user to undo the last operation, if there is an operation to undo. One or more schedule entries may be selected. Selecting one or more entries may cause the entry (or entries) to be highlighted, giving visual confirmation of the selection. Selecting multiple schedule entries may be allowed when the entries selected form a contiguous block of entries. Scheduler 180 may allow a user to delete a selected entry or entries. This removes the selected entries from the schedule. The delete operation may be available only when an entry (or entries) is selected.

Scheduler 180 may allow a user to get scheduler application help via an online user manual. Scheduler 180 may allow a user to display Scheduler application version and copyright information online.

The user interface of the scheduler 180 may be a GUI that provides two types of views, a theatre view and a screen view. The theatre view as shown in FIG. 3, displays the schedule for all of the screens in the theatre for a given day and allows a user to display the entire theatre's schedule on a day by day basis. The user can select the date of the schedule to be display, with the entire theatre schedule being available in this manner, one day at a time. Scrolling may be necessary to examine all the data for a given day as it may be too large to fit into a GUI window at one time. The Theatre view may be set as the default view that is displayed when scheduler 180 is started. The screen view shows the schedule for a given auditorium module 120 and allows a user to display a single screen's schedule across multiple days. The screen view spans the given decoding module 140's entire schedule although scrolling may be necessary to examine all parts of the schedule as it may be too large to fit into a GUI window at one time.

Scheduler 180 may allow no more than one window containing the Theatre view to be open at any one time. Scheduler 180 may allow no more than one window containing the Screen view for each screen in the theatre to be open at any time. Multiple screen views may be open at once as long as they are for different auditorium modules. Scheduler 180 may allow a user to select a window from a list of open windows belonging to the scheduler application in order to bring the selected window to the forefront of the application.

The scheduler 180 GUI may allow users to enter various commands to create, edit and/or save a schedule. Commands may include, but is not limited to, Undo, Select, Delete Scheduled playlist, Schedule Playlist, Reserve Screen, Edit Intermission playlist Properties, Go To Window, Help and About Scheduler. Here, Go To Window allows a user to bring an open GUI window to the forefront of the screen, in the event that multiple views are open.

Figure 5:
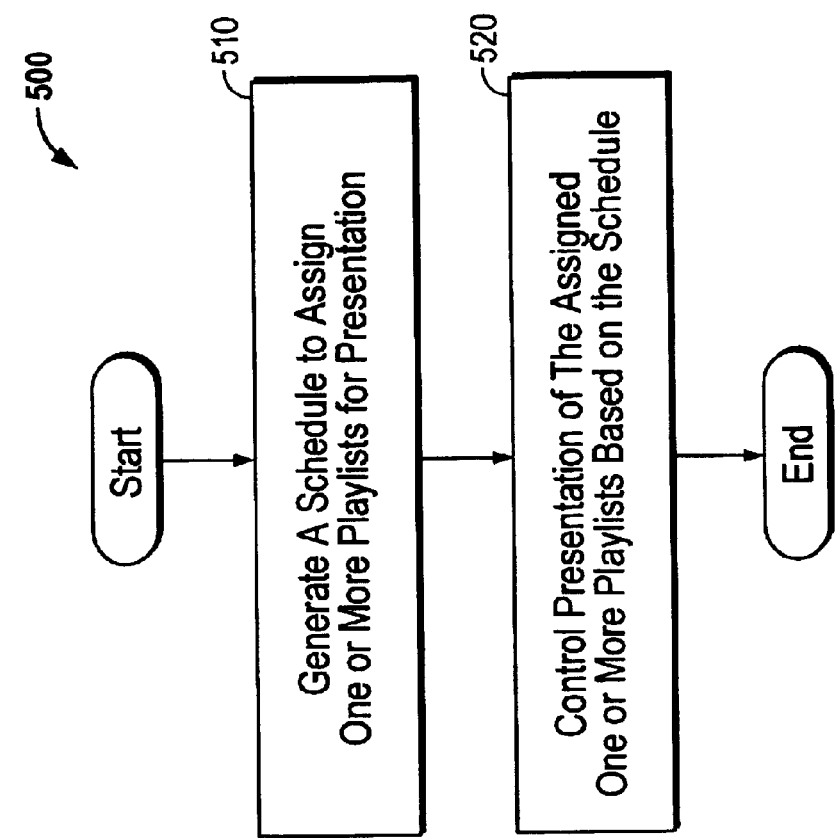
FIG. 5 shows an embodiment of a process for presentation in a digital cinema system.

Therefore, a schedule can be generated and updated. When a schedule is generated, playlist(s) is(are) presented based on the schedule. FIG. 5 shows one embodiment of a procedure 500 for presentation in a digital cinema. Generally, the procedure 500 comprises generating a schedule to assign one or more playlists for presentation (block 510) and controlling presentation of the assigned one or more playlists based on the schedule (block 520). Here, each playlist can be presented by the decoding module 140 of a specified auditorium module 120, at a specified date and/or a specified time in accordance with the assignment.

Figure 6:
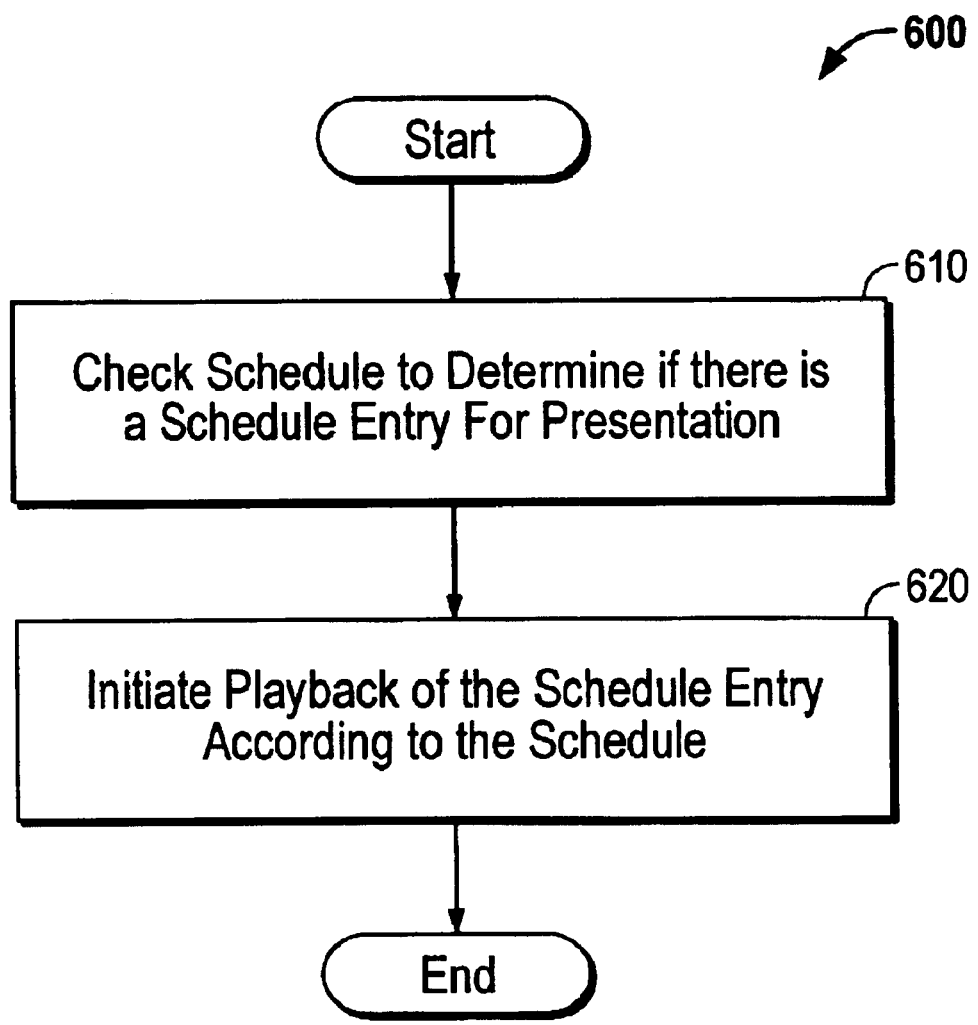
FIG. 6 shows an embodiment of a process for decoding programs for presentation in a digital cinema system.

When presenting playlist(s) based on a schedule, the decoding module 140 checks the schedule to determine if there is a schedule entry for presentation as shown in block 610 of FIG. 6. Here, a schedule entry is comprised of one or more programs. The playback of the schedule entry is initiated according to the schedule by appropriately decoding each program of the schedule entry (block 620). That is, each program of the schedule entry is retrieved from the storage module 130 and processed by the appropriate auditorium module 120 at the appropriate time according to the schedule.

Moreover, the decoding module 140 may operate in one of two modes, automatic and manual. In Automatic Mode, playback may be initiated without user intervention based on a schedule. This may be accomplished with no user intervention. User intervention is allowed to cancel or resume playback if any event interrupts the playback of a presentation. In Manual Mode, the playlist designated by the schedule may be cued for playback. The playback may then begin after a user enters a start command from the theatre manager 110 user interface.

The operating mode of the decoding module 140 may be a part of the saved state when a decoding module 140 shuts down so that the next time the decoding module is brought online it will come up in the same operating mode as its last saved state. If the operating mode cannot be determined from its last saved state, the default may be set to the Automatic Mode.

For purposes of explanation, a "Schedule Entry" refers to any scheduled playlist in the schedule. A "Current Schedule Entry" refers to the playlist that is currently being presented. A "Next Schedule Entry" refers to the playlist that a decoding module 140 will playback after the Current Schedule Entry. Therefore, in order for a decoding module 140 to know what Schedule Entry to process or playback, the decoding module 140 determines the Next Schedule Entry.

In order to determine the Next Schedule Entry upon initialization, the Current Schedule Entry is set to indicate that it is undetermined. Determining the Next Schedule Entry is then mode dependent. In Automatic Mode, the decoding module determines the Next Schedule Entry as the earliest Schedule Entry whose start time is equal to or greater than a current time. In Manual Mode, the current schedule entry is located in the schedule and the schedule entry immediately following the current schedule entry is determined to be the Next Schedule Entry. If the Current Schedule Entry is 'Undetermined', e.g. upon decoding module 140 initialization, the Next Schedule Entry is determined in the same manner as in Automatic Mode.

Also in automatic mode, playback of the Next Schedule Entry is initiated by the decoding module 140 according to the time it is scheduled to start. When the decoding module 140 determines its Next Schedule Entry, it checks to see if the start time is equal to the current time. If the start time is equal to the current time, the decoding module 140 starts playback of the Next Schedule Entry, otherwise the decoding module 140 waits until the specified start time to start playback. When processing begins on the Next Schedule Entry, the Next Schedule Entry becomes the Current Schedule Entry. When playback of the Current Schedule Entry completes, the decoding module 140 determines the Next Schedule Entry and initiates the playback accordingly.

In manual mode, playback of the Next Schedule Entry is initiated by a Start/Resume command from decoding module 140 or the theatre manager 110 user interface. When the Start/Resume command is received by the decoding module 140, the Next Schedule Entry becomes the Current Schedule Entry and playback begins. When playback of the Current Schedule Entry completes, the decoding module 140 determines the Next Schedule Entry and waits for the Start/Resume command to initiate playback.

Figure 7:
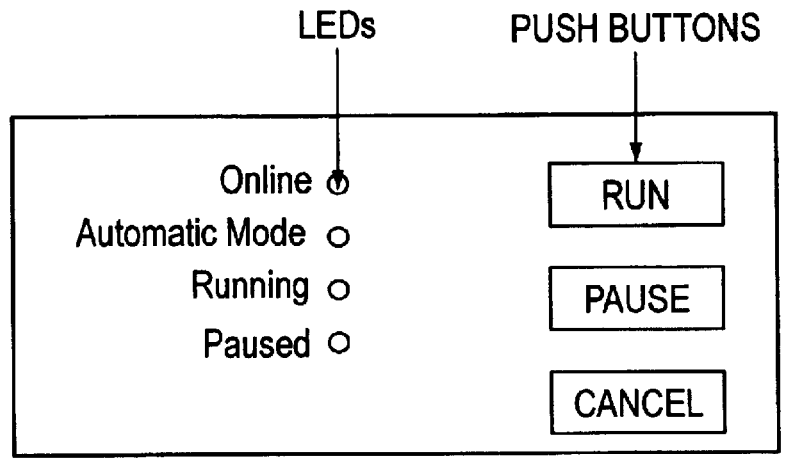
FIG. 7 shows an example of a decoding module user interface.

To allow a user to enter the Start/Resume command, the decoding module 140 may also comprise a user interface. The decoding module 140 user interface may comprise one or more visual indicators and/or buttons. The decoding module 140 user interface may be implemented by GUI, liquid crystal display (LCD), soft keys, and/or video graphic array (VGA) panels. FIG. 7 shows an example of the decoding module 140 user interface.

The decoding module 140 user interface may have a visual "Online" indicator that, when activated, signifies the decoding module 140 is online and ready for normal operation. The decoding module 140 user interface may have a visual "Running" indicator that, when activated, signifies the decoding module 140 is currently processing the Current Schedule Entry or Intermission playlist. The decoding module 140 user interface may have a visual "Paused" indicator that, when activated, signifies the processing of the Current Schedule Entry or Intermission playlist has been paused.

The decoding module 140 user interface may have a "Run" button that allows a user to tell the decoding module 140 to start processing the Next Schedule Entry, or to resume processing the Current Schedule Entry or Intermission playlist if the processing has been paused. The decoding module 140 user interface may have a "Pause" button that allows a user to pause the processing of the Current Schedule Entry or Intermission playlist. The decoding module 140 user interface may have a "Cancel" button that allows a user to cancel the processing of the Current Schedule Entry. Note that the Run, Pause and Cancel buttons may be any other input means such as a switch, dial or a touch panel.

The theatre manager 110 user interface (UI) provides remote access to some or all of the playback control functionality that is available from the decoding module 140 user interface (UI). More particularly, the theatre manager 110 UI may have one or a combination of the Online indicator, the Running indicator, the Paused indicator, input to Run, input to Pause and input to Cancel. When a playback control related command is entered at the theatre manager 110, the theatre manager 110 sends a message to the indicated decoding module 140 and the decoding module 140 carries out the appropriate behavior. In addition, the theatre manager 110 user interface provides functionality to change the mode of the decoding module 140 and to enable the Intermission playlist Auto Start feature for Manual Mode.

Changing the mode of a decoding module is accomplished by entering the change mode command at the theatre manager 110 user interface. The change mode function is not available via the decoding module 140 user interface. When a change mode command is received by a decoding module 140, the decoding module 140 determines the Next Schedule Entry according to its new mode as it does upon initialization, i.e. as if the Current Schedule Entry is "undetermined." If a decoding module 140 receives the change mode command while it is processing a playlist (or Paused), it waits until the processing has completed or is cancelled before updating the Next Schedule Entry, so as not to interfere with the current presentation (changing the mode should have no effect on a presentation in progress).

As part of the nominal decoding module 140 shutdown procedure, the current operating mode of the decoding module 140 is saved in persistent memory. This allows the decoding module 140 to come back online in the same operating mode as it was when it last shutdown.

Regardless of the operational mode, the decoding module 140 can be in one of three states. Intermission is the state of a decoding module 140 during an Intermission. Running is the state of the decoding module 140 when processing a Schedule Entry. Paused is the state of the decoding module 140 after the Pause command is received when in Running state. The commands available to the user in each state may vary depending on the mode.

Figure 8:
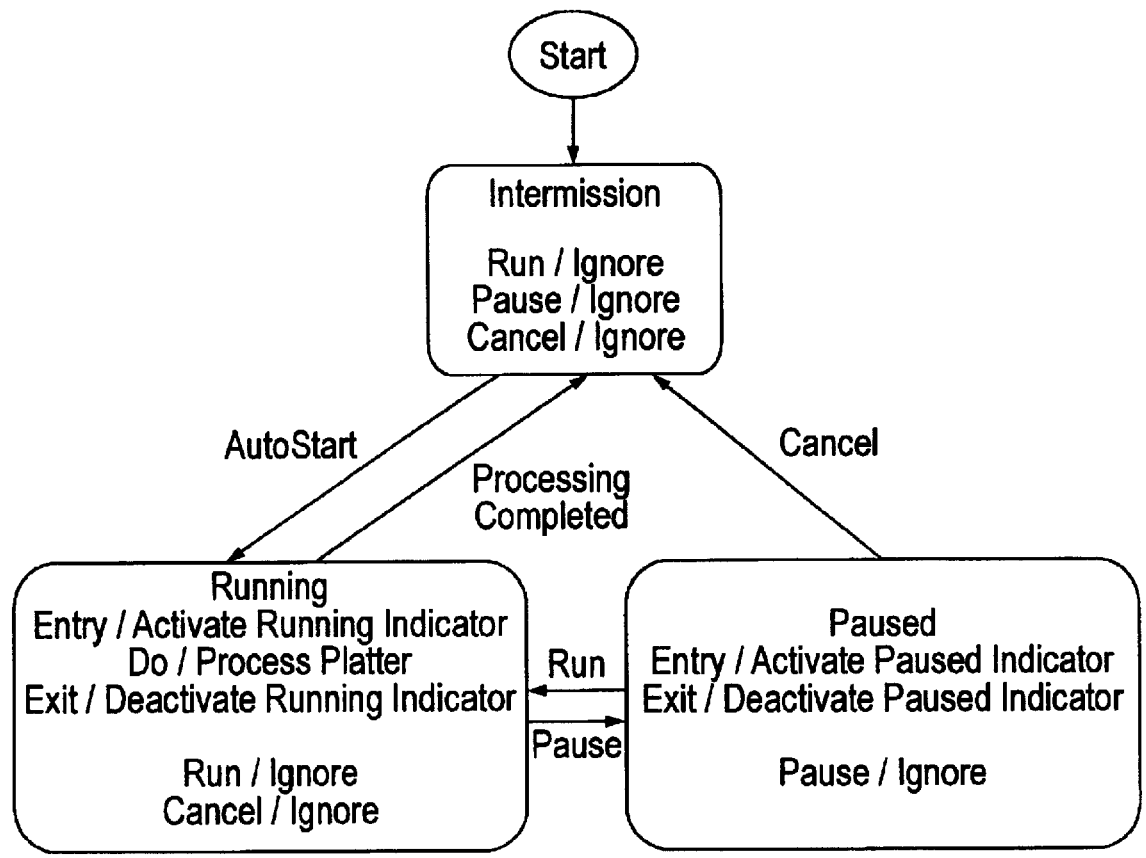
FIG. 8 shows the decoding module user interface transition diagram for automatic mode.

FIG. 8 shows a state transition chart for Automatic Mode. Each state represents a Decoding module 140 User Interface state. Run, Pause, and Cancel transition events correspond to inputs entered at the decoding module 140 UI or from the theatre manager UI. AutoStart event occurs when the start time of the Next Schedule Entry arrives. Transitioning from Running to Intermission occurs when the processing of the Current Schedule Entry completes. Here, if enablement of the Intermission playlist is provided and activated, the decoding module 140 presents playlist(s) specified as Intermission playlist, without user intervention.

Note that in FIG. 8, a state may optionally have some action(s) performed each time the state is entered or exited, denoted respectively as "entry [condition]/action" and "exit [condition]/action", where action describes the action taken. A state may optionally have an activity that is performed while in the state, denoted by "do [condition]/activity", where activity describes the activity performed. Each entry, do, and exit statement may optionally have a condition associated with it, contained within square brackets ('[' and ']'). The condition is a Boolean expression that causes the transition and associated action to occur only if the expression evaluates to 'true'. A state may contain multiple entry, do, and exit actions.

A state may also process certain events that cause action to be taken without causing a transition to another state, denoted by "event [condition]/action", where event is the name of the event, [condition] is a Boolean expression that causes the action to occur only if the expression evaluates to 'true', and action is the action taken when the event is received. Actions are associated with transitions, occur quickly and cannot be interrupted. Activities are associated with states, can take a while to perform and can be interrupted. If an entry, do, exit, or event designation is explicitly specified for a state then the state has no associated action or activity for the unspecified designation. Transitions consist of an event and, optionally, a condition and/or an action.

Figure 9:
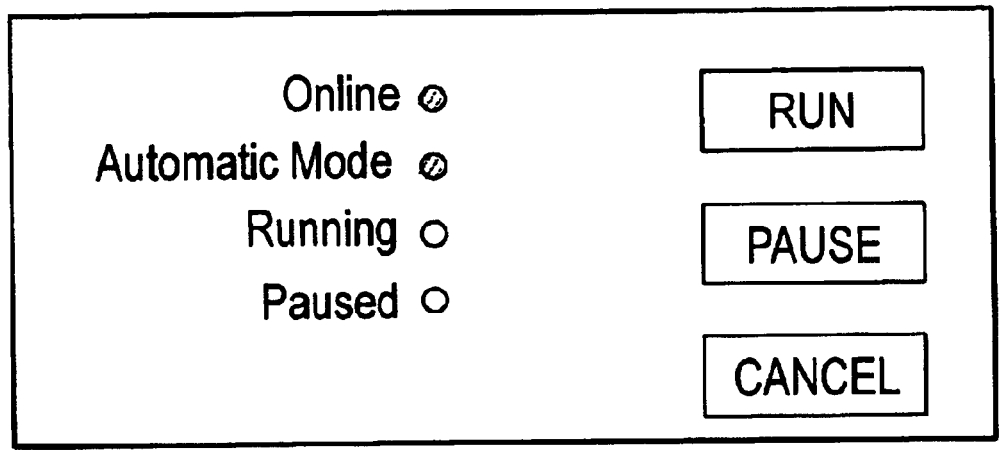
FIGS. 9–11 show various the decoding module user interface in various states when in automatic mode.

When the decoding module 140 is in Automatic Mode the Automatic Mode Indicator on the decoding module 140 user interface is activated. FIG. 9 shows the decoding module 140 user interface for the Intermission State in Automatic Mode. In this state, there would be nothing onscreen. For example, the projector 150 may be dowsed. Also, there is no available functions for Idle state in Automatic Mode. Next Schedule Entry cannot be started manually. When start time of Next Schedule Entry arrives, the decoding module 140 starts processing the Next Schedule Entry. Decoding module 140 user interface enters a Running state.

Figure 10:
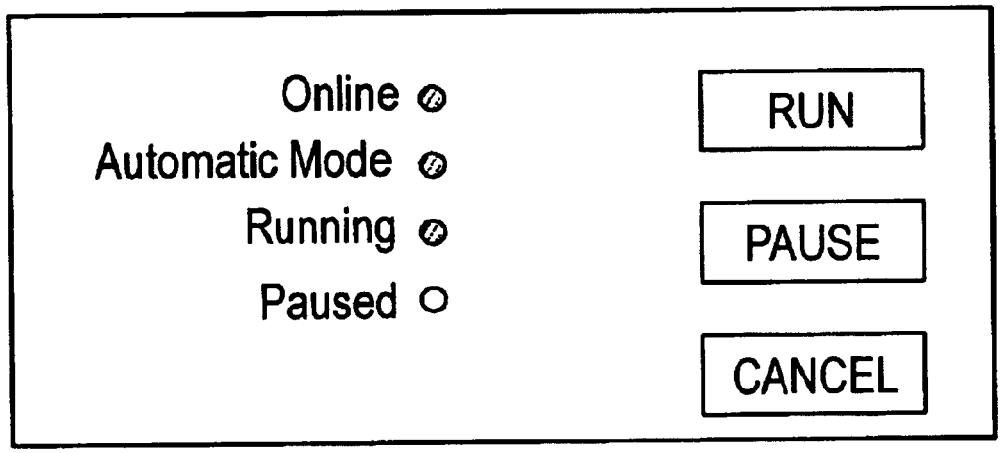

FIG. 10 shows the decoding module 140 user interface for the Running State in Automatic Mode. In this state, the decoding module 140 is presenting a scheduled playlist (Current Schedule Entry). When presentation is complete, the next is either Intermission or Running depending upon whether the Intermission playlist is activated or now is the start time of the Next Schedule Entry. The available function is PAUSE which causes decoding module 140 to pause the presentation.

Figure 11:
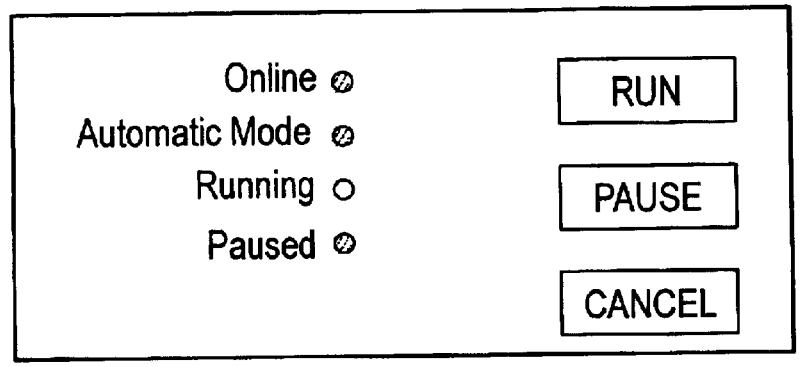

FIG. 11 shows the decoding module 140 user interface for the Paused State in Automatic Mode. In this state, there also would be nothing onscreen. For example, the projector 150 may be dowsed. The available functions are RUN and Cancel. The Run command causes the decoding module 140 to resume presentation where it left off. The CANCEL command causes decoding module 140 to abort processing of Current Schedule Entry.

Figure 12:
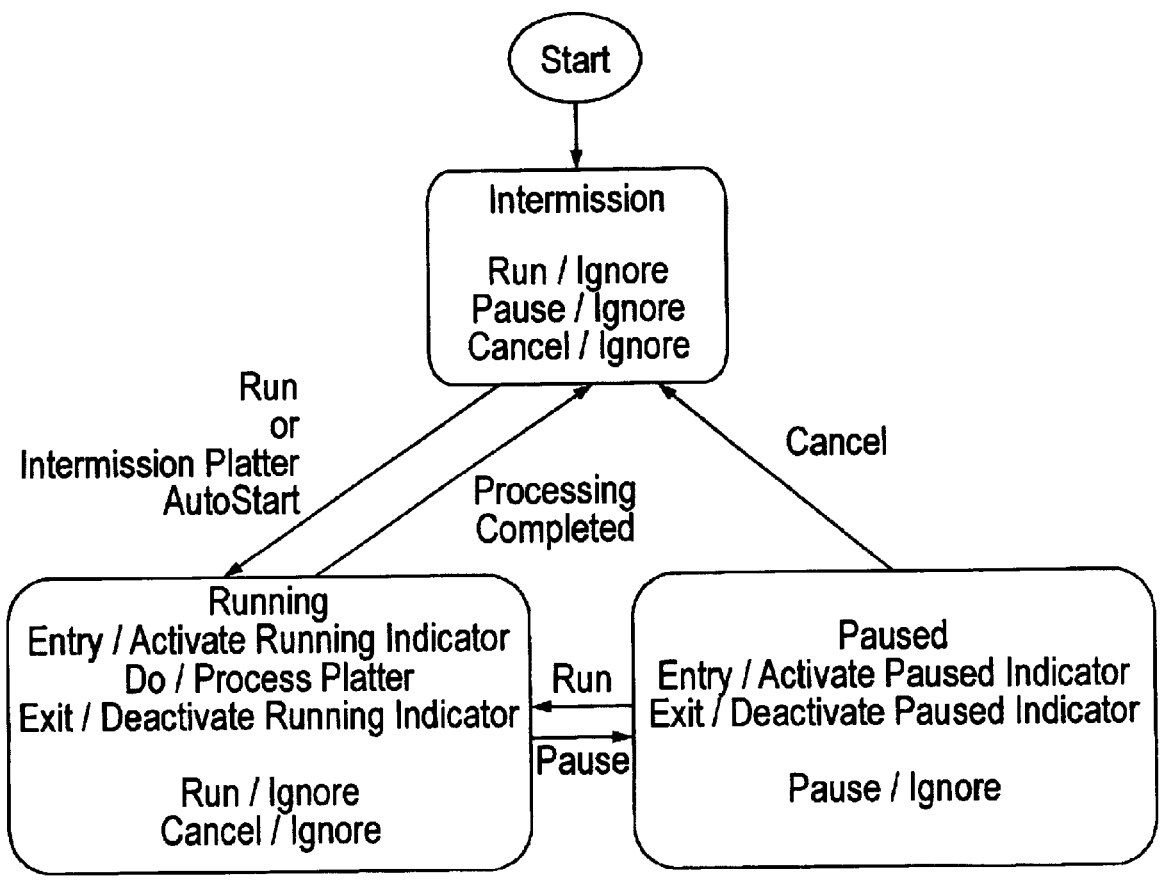
FIG. 12 shows the decoding module user interface transition diagram for manual mode.

FIG. 12 shows the state transition chart for Manual Mode. Each state represents a Decoding module 140 User Interface state. Run, Pause, and Cancel transition events correspond to buttons being pushed at the decoding module 140 UI (or from the theatre manager UI). Enablement of Intermission playlist can also be provided in Manual Mode. If activated, the Intermission playlist AutoStart event occurs when Auto Start feature of the Intermission playlist is enabled (from the theatre manager GUI). Transitioning from Running to Intermission occurs when the processing of the Current Schedule Entry completes. Here, the decoding module 140 presents playlist(s) specified as Intermission playlist without user intervention.

When the decoding module 140 is in Manual Mode the Automatic Mode Indicator on the decoding module 140 user interface is deactivated. FIG. 11 shows the decoding module 140 user interface for the Intermission State in Manual Mode. In this state, there would be nothing onscreen. The projector 150 may be dowsed. The available function is RUN which causes the decoding module 140 to begin processing the Next Schedule Entry.

Figure 13:
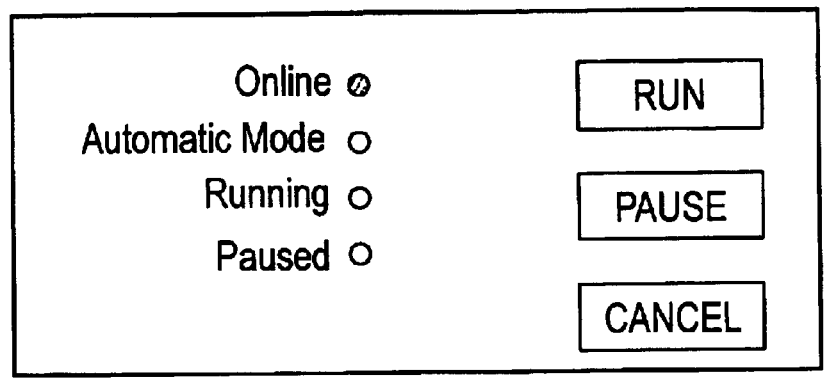
FIGS. 13–15 show various the decoding module user interface in various states when in manual mode.

FIG. 13 shows the decoding module 140 user interface for the Running State in Manual Mode. In this state, the decoding module 140 is presenting scheduled playlist (Current Schedule Entry). When presentation is complete, next decoding module 140 UI state is either Intermission or Running if the Intermission playlist is activated and Intermission playlist Auto Start is enabled. The available function is PAUSE which causes decoding module 140 to pause the presentation.

Figure 14:
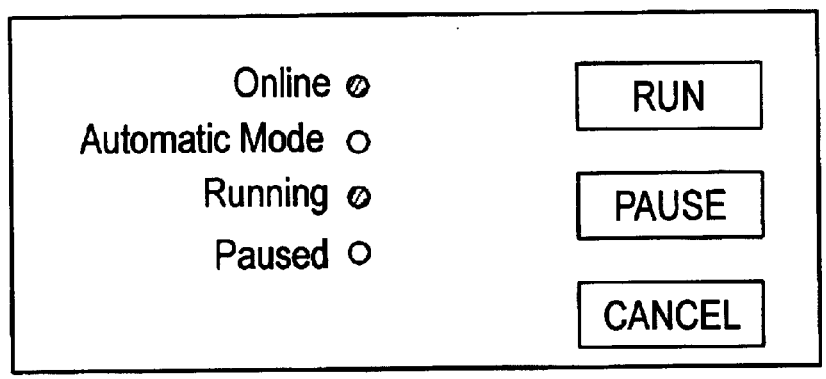
Figure 15:
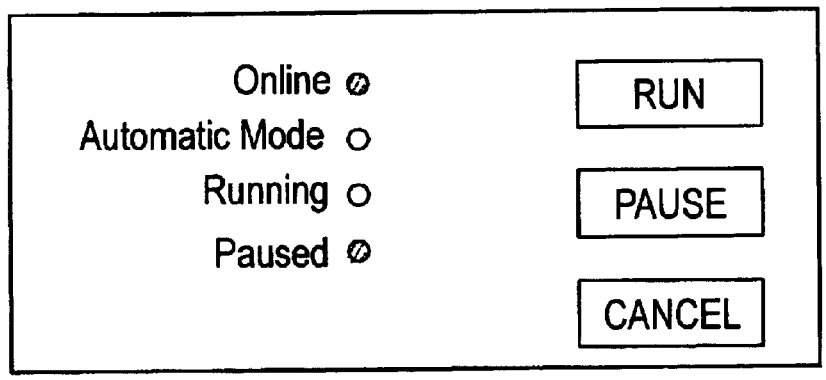

FIG. 14 shows the decoding module 140 user interface for the Paused State in Manual Mode. In this state, there would be nothing onscreen. The projector 150 may be dowsed. The available functions are RUN and CANCEL. RUN command causes decoding module 140 to resume presentation where it left off. CANCEL causes decoding module 140 to abort processing of Current Schedule Entry.

Therefore, a single playlist or a schedule comprising of one or more playlist(s) can be scheduled or assigned for presentation. However, the foregoing embodiments are merely exemplary and are not to be construed as limiting the invention. For example, although FIG. 1 shows the storage module 130 as separately implemented in the theatre subsystem 104, each auditorium module 120 may be implemented with a storage module 130. Also, in theatre systems having multiple auditoriums, each auditorium module may process and present a different playlist from other auditorium modules, or one or more auditorium modules may simultaneously process and present the same playlist. That is, the scheduler may assign a predetermined playlist for at least two presentations such that one presentation of the predetermined playlist begins before the end of the other presentation.

Moreover, while a theatre complex has a theatre manager, in context of other presentation systems, a theatre manager may be any module capable of implementing a scheduler and optionally a playlist builder. Similarly, in context of other presentations, an auditorium module may be any module capable of processing and presenting a playlist. Accordingly, the present teachings can be readily applied to other types of apparatuses. The description of the invention is intended to be illustrative, and not to limit the scope of the claims. Many alternatives, modifications, and variations will be apparent to those skilled in the art.

What is claimed is:

1. In a digital cinema system having at least one storage module and at least one auditorium module, a presentation system comprising:
    a theatre manager configured to control presentation; and
    a scheduler configured to allow assignment of one playlist for presentation, the scheduler further configured to allow assignment of one or more playlists for presentation by generating a schedule and configured to verify that the system has resources to present contents of each assigned playlist when generating the schedule.

2. The presentation system of claim 1, wherein the scheduler is implemented in the theatre manager.

3. The presentation system of claim 1, wherein the scheduler is configured to store the schedule in the storage module.

4. The presentation system of claim 1, wherein the storage module is configured to store one or more programs and wherein the presentation system further comprises:
    a playlist builder coupled to the scheduler, the playlist builder configured to generate at least one playlist based on the programs stored in the storage module.

5. The presentation system of claim 4, wherein the playlist builder is configured to store the playlist in the storage module.

6. The presentation system of claim 1, further comprising:
    a decoding module configured to prepare contents of each assigned playlist for playback.

7. The presentation system of claim 6, wherein the decoding module is configured to verify that the presentation system has resources to present the contents of each assigned playlist.

8. The presentation system of claim 6, wherein the decoding module is configured to check the schedule and control playback of each assigned playlist based on the schedule.

9. The presentation system of claim 6, wherein the decoding modules is configured to check the schedule and cue a user to control playback of each assigned playlist.

10. The presentation system of claim 1, wherein the scheduler is configured to designate a playlist as a repeating playlist.

11. The presentation system of claim 1, wherein the scheduler is configured to designate a playlist as an intermission playlist.

12. The presentation system of claim 11, wherein the scheduler is configured to enable or disable the intermission playlist and wherein the intermission playlist is presented between each assigned playlist if the intermission playlist is enabled.

13. The presentation system of claim 1, wherein the scheduler is configured to assign a predetermined playlist for at least two presentations such that one presentation the predetermined playlist initiates before the completion of another presentation of the predetermined playlist.

14. The presentation system of claim 1, wherein the scheduler is configured to reserve the auditorium module for a specified period of time.

15. The presentation system of claim 1, wherein the scheduler is configured to generate the schedule by displaying a list of playlists, receiving selection of one or more playlists for presentation and generating the schedule based on the selected one or more playlist.

16. The presentation system of claim 15, wherein the scheduler comprises a user interface configured to receive selection of one or more playlists for presentation.

17. The presentation system of claim 16, wherein the user interface is one of a graphical user interface (GUI), a liquid crystal display, soft keys or video graphic array panel.

18. The presentation system of claim 17, wherein the GUI is configured to provide either one or both a theatre view and a screen view.

19. In a digital cinema system having at least one storage module and at least one auditorium module, a presentation system comprising:
    a theatre manager configured to control presentation; and
    a scheduler configured to allow assignment of one playlist for presentation, the scheduler further configured to store one or more playlists for presentation by generating a schedule and configured to send a message indicating a change in the schedule if a change is made in the schedule.

20. In a digital cinema system, a method for presentation comprising:
    generating a schedule to assign one or more playlists for presentation;
    controlling presentation of the assigned one or more playlists based on the schedule; and
    verifying that the digital cinema system has resources to present each assigned playlist when generating the schedule.

21. The method of claim 20, wherein generating the schedule comprises:
    designating a playlist as a repeating playlist.

22. The method of claim 20, wherein generating the schedule comprises:
    designating a playlist as an intermission playlist.

23. The method of claim 22, further comprising either one of:
    assigning and presenting the intermission playlist between a predetermined two assigned playlists; or
    presenting the intermission playlist between each assigned playlist.

24. The method of claim 20, wherein generating the schedule comprises:

assigning a predetermined playlist for at least two presentations such that a second presentation of the predetermined playlist begins before the end of a first presentation.

25. The method of claim 20, wherein generating the schedule comprises:
reserving an auditorium module for a specified period of time.

26. In a digital cinema system, a method for presentation comprising:
generating a schedule to assign one or more playlists for presentation;
controlling presentation of the assigned one or more playlists based on the schedule; and
sending a message indicating a change in the schedule if a change is made in the schedule.

27. In a digital cinema system, a presentation system comprising:
means for assigning a single playlist for presentation;
means for generating a schedule to assign one or more playlists for presentation; and
means for verifying that the system has resources to present each assigned playlist before presenting each assigned playlist.

28. The presentation system of claim 27, further comprising:
means for controlling presentation of each assigned playlist.

29. The presentation system of claim 28, wherein the means for controlling presentation comprises:
means for checking the schedule; and
means for controlling playback of contents of the assigned playlist based on the schedule.

30. The presentation system of claim 28, wherein the means for controlling presentation comprises:
means for checking the schedule; and
means for cueing a user to control playback of contents of the assigned playlist.

31. The presentation system of claim 27, further comprising:
means for designating one of the stored playlist as a repeating playlist.

32. The presentation system of claim 27, further comprising:
means for designating one of the stored playlist as an intermission playlist.

33. The presentation system of claim 32, further comprising:
means for enabling or disabling the intermission playlist; and
means for presenting the intermission playlist between each assigned playlist if the intermission playlist is enabled.

34. In a digital cinema system, a presentation system comprising:
means for assigning a single playlist for presentations;
means for generating a schedule to assign one or more playlists for presentation; and
means for sending a message indicating a change in the schedule if a change is made in the schedule.

35. In a digital cinema system, a method for generating a schedule comprising:

displaying a list of playlists;
assigning one or more playlists for presentation based on the list;
generating a schedule based on the one or more assigned playlists;
verifying that the digital cinema system has resources to present each playlist assigned in the schedule when generating the schedule; and
rejecting assignment of a playlist in the schedule if the digital cinema system does not have the resource.

36. The method of claim 35, wherein verifying the resources comprises either one or a combination of:
checking that each image program needed to present each assigned playlist exists;
checking that each audio program needed to present each assigned playlist exists;
checking that no security conflict exists;
checking that no time conflicts are created; and
checking that there is no resource conflicts.

37. The method of claim 36, further comprising:
sending a message that indicates a reason for the rejection.

38. The method of claim 35, wherein the schedule comprises either one or a combination of a list of assigned playlist identifications (IDs), times that each assigned playlist is scheduled to be presented, and ID of a decoding module that is to present each assigned playlist.

39. The method of claim 35, further comprising either one or a combination of:
specifying an auditorium module for which each playlist is to be assigned;
specifying a presentation start date of each assigned playlist; and
specifying a presentation end date of each assigned playlist.

40. The method of claim 39, further comprising:
specifying the start time for one day.

41. The method of claim 40, further comprising:
replicating the start time across multiple days, starting on a presentation start date and ending on a presentation end date, if a presentation end date that is later than a presentation start date.

42. The method of claim 35, further comprising:
designating a playlist as a repeating playlist; and
assigning the repeating playlist in the schedule.

43. The method of claim 35, further comprising:
designating a playlist as an intermission playlist.

44. The method of claim 43, further comprising either one of:
assigning the intermission playlist in the schedule; or
presenting the intermission playlist between each assigned playlist in the schedule.

45. In a digital cinema system, a scheduling system for generating a schedule comprising:
means for displaying a list of playlists;
means for assigning one or more playlists for presentation based on the list;
means for generating a schedule based on the selected one or more playlists;
means for verifying that the digital cinema system has resources to present each playlist assigned in the schedule when generating the schedule; and
means for rejecting assignment of a playlist in the schedule if the digital cinema system does not have the resource.

46. The scheduling system of claim 45, wherein the means for verifying the resources comprises either one or a combination of:
   means for checking that each image program needed to present each assigned playlist exists;
   means for checking that each audio program needed to present each assigned playlist exists;
   means for checking that no security conflict exists;
   means for checking that no time conflicts are created; and
   means for checking that there is no resource conflicts.

47. The scheduling system of claim 45, further comprising:
   means for sending a message that indicates a reason for the rejection.

48. The scheduling system of claim 45, further comprising either one or a combination of:
   means for specifying an auditorium module for which each playlist is to be assigned;
   means for specifying a presentation start date of each selected playlist; and
   means for specifying a presentation end date of each selected playlist.

49. The scheduling system of claim 48, further comprising:
   means for specifying the start time for one day.

50. The scheduling system of claim 49, further comprising:
   means for replicating the start time across multiple days, starting on a presentation start date and ending on a presentation end date, if a presentation end date that is later than a presentation start date.

51. The scheduling system of claim 45, further comprising:
   means for designating a playlist as a repeating playlist; and
   means for assigning the repeating playlist in the schedule.

52. The scheduling system of claim 45, further comprising:
   means for designating a playlist as an intermission playlist.

53. The scheduling system of claim 52, further comprising:
   means for assigning the intermission playlist in the schedule; and
   means for presenting the intermission playlist between each assigned playlist in the schedule.

54. In a digital cinema system, a method for decoding programs for playback comprising:
   checking a schedule to determine if there is a schedule entry for presentation, the schedule entry being comprised of one or more programs; and
   initiating playback of the schedule entry according to the schedule by appropriately decoding each program of the schedule entry.

55. The method of claim 54, wherein checking the schedule comprises:
   determining a next schedule entry for presentation.

56. The method of claim 55, wherein initiating playback comprises:
   initiating playback of the next schedule entry according to the time it is scheduled to start.

57. The method of claim 56, wherein determining the next schedule entry comprises:
   determining an earliest schedule entry whose start time is equal to or greater than a current time; and
   determining the earliest schedule entry as the next schedule entry.

58. The method of claim 55, further comprising:
   cueing a user to control the playback of the next schedule entry.

59. The method of claim 58, wherein determining the next schedule entry comprises:
   locating a current schedule entry and determining an entry following the current schedule entry to be the next schedule entry; and otherwise
   determining the next schedule entry as the earliest schedule entry whose start time is equal to or greater than a current time.

60. In a digital cinema system, a decoding system for decoding programs comprising:
   starting presentation of a currently scheduled playlist from the beginning of the playlist when a start command is received, if the decoding system is in an intermission state;
   starting presentation of the currently scheduled playlist from approximately the point the playlist was stopped when a start command is received, if the decoding system is in a paused state;
   entering the paused state when a stop command is received before completing the presentation of the playlist; and
   entering the intermission state either if a cancel command is received or if the presentation of the playlist is completed.

61. The system of claim 60, wherein the decoding system comprises a user interface.

62. The system of claim 61, wherein the user interface is one of a graphical user interface (GUI), a liquid crystal display, soft keys or video graphic array panel.

63. The system of claim 61, wherein the user interface comprises either one or a combination of:
   a visual indicator that signifies that the decoding system is online,
   a visual indicator that signifies that the decoding system is currently processing a playlist, and
   a visual indicator that signifies that the decoding system is in the paused state.

64. The system of claim 61, wherein the user interface comprises either one or a combination of:
   means for receiving the start command;
   means for receiving the pause command; and
   means for receiving the cancel command.

65. The system of claim 60, further comprising a theatre manager, wherein the theatre manager comprises a user interface.

66. The system of claim 65, wherein the user interface is one of a graphical user interface (GUI), a liquid crystal display, soft keys or video graphic array panel.

67. The system of claim 65, wherein the user interface comprises either one or a combination of:
   a visual indicator that signifies that the decoding system is online;
   a visual indicator that signifies that the decoding system is currently processing a playlist; and
   a visual indicator that signifies that the decoding system is in the paused state.

68. The system of claim 65, wherein the user interface comprises either one or a combination of:
   means for receiving the start command;
   means for receiving the pause command; and
   means for receiving the cancel command.

* * * * *